(12) United States Patent
Bae

(10) Patent No.: US 10,193,392 B2
(45) Date of Patent: Jan. 29, 2019

(54) WIRELESS POWER TRANSFER DEVICE AND WIRELESS POWER TRANSFER SYSTEM

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 68 days.

(21) Appl. No.: 15/110,665

(22) PCT Filed: Jan. 7, 2015

(86) PCT No.: PCT/KR2015/000163
§ 371 (c)(1),
(2) Date: Jul. 8, 2016

(87) PCT Pub. No.: WO2015/105334
PCT Pub. Date: Jul. 16, 2015

(65) Prior Publication Data
US 2016/0329752 A1   Nov. 10, 2016

(30) Foreign Application Priority Data

Jan. 8, 2014   (KR) .................. 10-2014-0002327
Jan. 24, 2014  (KR) .................. 10-2014-0009243

(51) Int. Cl.
| | |
|---|---|
| *H01F 27/42* | (2006.01) |
| *H02J 50/12* | (2016.01) |
| *H02J 50/40* | (2016.01) |
| *H02J 50/80* | (2016.01) |
| *H02J 7/02* | (2016.01) |

(Continued)

(52) U.S. Cl.
CPC ............. *H02J 50/12* (2016.02); *H02J 7/025* (2013.01); *H02J 7/041* (2013.01); *H02J 50/40* (2016.02);

(Continued)

(58) Field of Classification Search
CPC ............ H02J 50/80; H02J 7/025; H02J 50/40; H02M 7/53873; H04B 5/0037
See application file for complete search history.

(56) References Cited

U.S. PATENT DOCUMENTS

| 7,180,347 B2 | 2/2007 | Azmoodeh |
| 2010/0109443 A1 | 5/2010 | Cook et al. |

(Continued)

FOREIGN PATENT DOCUMENTS

| CN | 102751773 A | 10/2012 |
| CN | 103326475 A | 9/2013 |

(Continued)

OTHER PUBLICATIONS

International Search Report issued in PCT/KR2015/000163, dated Mar. 31, 2015.

(Continued)

*Primary Examiner* — Jared Fureman
*Assistant Examiner* — Duc M Pham
(74) *Attorney, Agent, or Firm* — Birch, Stewart, Kolasch & Birch, LLP

(57) ABSTRACT

A wireless power transfer system according to an embodiment of the present invention is a wireless power transfer system having a receiving part for receiving power from a transmitting part, wherein the transmitting part comprises: a power conversion part comprising a full bridge inverter; and a control part for controlling the power conversion part using a pulse width modulation (PWM) control signal, the duty ratio of the PWM control signal being determined by a duty ratio in which the ratio of the magnitude of harmonics to the magnitude of a fundamental frequency among frequency components of the output signal of the power conversion part is a minimum.

8 Claims, 14 Drawing Sheets

(51) Int. Cl.
*H02J 7/04* (2006.01)
*H04B 5/00* (2006.01)

(52) U.S. Cl.
CPC .......... *H02J 50/80* (2016.02); *H04B 5/0037* (2013.01); *H04B 5/0075* (2013.01)

(56) References Cited

U.S. PATENT DOCUMENTS

| | | |
|---|---|---|
| 2011/0248571 A1 | 10/2011 | Kim et al. |
| 2013/0128638 A1 | 5/2013 | Irish |
| 2013/0241304 A1 | 9/2013 | Bae |
| 2013/0278071 A1 | 10/2013 | Komiyama |
| 2013/0334893 A1 | 12/2013 | Takahashi |
| 2014/0054971 A1 | 2/2014 | Kissin et al. |
| 2014/0078783 A1* | 3/2014 | Huang .............. H02M 3/33576 363/17 |
| 2014/0226462 A1 | 8/2014 | Smith et al. |
| 2014/0241012 A1* | 8/2014 | Lindberg-Poulsen ....................... H02M 3/33523 363/17 |

FOREIGN PATENT DOCUMENTS

| | | |
|---|---|---|
| CN | 103378658 A | 10/2013 |
| EP | 2642628 A1 | 9/2013 |
| JP | 11-224822 A | 8/1999 |
| JP | 2013-106490 A | 5/2013 |
| JP | 2013-198402 A | 8/2013 |
| JP | 2013-223409 A | 9/2013 |
| JP | 2013-251974 A | 12/2013 |
| JP | 2015-536123 A | 12/2015 |
| KR | 10-2011-0112921 A | 10/2011 |
| KR | 10-2012-0138832 A | 12/2012 |
| WO | WO 2013/038808 A1 | 3/2013 |
| WO | WO 2013/074529 A1 | 5/2013 |
| WO | WO 2013/179763 A1 | 12/2013 |

OTHER PUBLICATIONS

Kim et al., A study on the THD reduction of single phase 2 level inverter for grid connection for ship, Journal of the Korean Society of Marine Engineering, vol. 38, No. 1, 2014, pp. 64-69.

* cited by examiner

WIRELESS POWER TRANSFER DEVICE AND WIRELESS POWER TRANSFER SYSTEM

CROSS REFERENCE TO RELATED APPLICATIONS

This application is the National Phase of PCT International Application No. PCT/KR2015/000163, filed on Jan. 7, 2015, which claims priority under 35 U.S.C. 119(a) to Patent Application No 10-2014-0002327, filed in the Republic of Korea on Jan. 8, 2014 and Patent Application No. 10-2014-0009243, filed in the Republic of Korea on Jan. 24, 2014, all of which are hereby expressly incorporated by reference into the present application.

TECHNICAL FIELD

Embodiments relate to a wireless power transfer technology.

BACKGROUND ART

Wireless power transfer (WPT) system is a technology of transferring power through a space without any wire, which maximizes ease of providing mobile equipment and digital appliances with power.

The wireless power transfer system has advantages of saving energy by a power usage control in real time, overcoming a restriction of space needed for providing power and reducing waste batteries by recharging batteries.

The wireless power transfer system is typically embodied in a magnetic induction scheme or a magnetic resonance scheme.

The magnetic induction scheme is a non-contact energy transfer technique where current is applied to one of two coils disposed closely each other and by means of the magnetic flux generated accordingly electromotive force is also applied to the other coil, which may use frequencies of hundreds of kHz.

The magnetic resonance scheme is a magnetic resonance technique where electric field or magnetic field only is used without using electromagnetic waves or current so that the distance of power transfer is more than several meters, which has a characteristic that band having tens of MHz is used.

However, there is a problem that power loss occurs due to the current loss at a receiving side.

Additionally, in the wireless power transfer system, there occurs a spurious wave, that is, a harmonic coming from a power transmitter, and such a harmonic component may cause an electromagnetic interference effect, thereby having a harmful effect on a body.

The harmonic refers to a frequency higher than a commercial frequency in terms of power, hundreds of Hz or higher, for example, which has integer multiple frequency of a fundamental.

The wireless power transfer system generates the harmonic component near the multiple frequency of the receiving frequency due to a non-linear characteristic of the receiver load, basically. That is, the AC signal provided from the receiver does not remain as its waveform but is distorted due to the non-linear load, forming a harmonic.

The harmonic component disturbs normal operations of surrounding equipment or causes undesired power reception, noise and various obstacles.

In more detail, changes of magnetic field emitting from the power transmitter generate current caused by electromagnetic induction phenomenon in a conductor of a stationary surrounding equipment, capable of causing abnormal operations. Also, magnetic field generated in the power transmitter causes current in a mobile equipment when the mobile equipment moves around the magnetic field, capable of causing obstacles. Also, when the power transmitter has a resonance condition similar to that of the surrounding equipment that does not want to receive power, there may occur a magnetic resonance coupling, capable of causing erroneous operations in the surrounding equipment.

Since the harmonic component may cause harmful effect on an electronic equipment and a body as described above, it is important to meet regulations for an electromagnetic compatibility (EMC), an electromagnetic interference (EMI) and an electromagnetic susceptibility (EMS).

FIG. 1 is a block diagram of a transmitter for transmitting power in a conventional wireless power transfer system.

Referring to FIG. 1, the transmitter 1 may include a gate driver 2, a power converter 3 of a half bridge type, a matching circuit 4, and a transmission coil 5.

A half bridge circuit of the power converter 3 in the art has two switches that are complementarily turned on and turned off when proper voltage waveforms are applied to gage driving inputs, respectively.

At this time, a square wave voltage generates which is used to switch between a common node of the two switches and the ground.

Since the output not of a sine wave but of the square wave has a problem that it has many of harmonic components that are integer multiple frequency of a fundamental wave, it is limited to reduce the harmonic using the power converter 3 in the art.

INVENTION

Technical Problem

An embodiment of the present disclosure provides a wireless power transfer device that is capable of minimizing current wasted or consumed and enhancing a wireless power transfer efficiency.

Another embodiment of the present disclosure provides a wireless power transfer system that includes the wireless power transfer device.

Yet another embodiment of the present disclosure provides a wireless power transfer device and a wireless power transfer system including the same that solve obstacles such as power reception and noise due to harmonic components included in an output signal of a power conversion part of a transmitter for transmitting power.

Still yet another embodiment of the present disclosure provides a wireless power transfer device and a wireless power transfer system including the same that approximates an output waveform of the power conversion part to a sign wave using the power conversion part including a full bridge inverter, improving a harmonic distortion ratio.

Still yet another embodiment of the present disclosure provides a wireless power transfer device and a wireless power transfer system including the same that feedback an output signal outputted from a power conversion part to measure a distribution of harmonic elements of the output signal and to provide a duty ratio that is capable of minimizing the harmonic components.

Technical Solution

In accordance with an embodiment of the present disclosure, there is provided a transmitter for generating a wireless power to be transmitted to a receiver, the transmitter comprising a power conversion part comprising a full bridge inverter; and a control part for controlling the power conversion part using a pulse width modulation (PWM) control signal, wherein a duty ratio of the PWM control signal is determined by a duty ratio in which a ratio of the magnitude of an harmonic to the magnitude of a fundamental frequency among frequency components of an output signal of the power conversion part is a minimum.

In the transmitter according to another embodiment of the present disclosure, the harmonic may have the maximum magnitude of a plurality of harmonic components that have frequencies of the output signal different with one another.

In the transmitter according to another embodiment of the present disclosure, the duty ratio may be 26% to 44%.

In the transmitter according to another embodiment of the present disclosure, the duty ratio may be 41% or 32%.

In the transmitter according to another embodiment of the present disclosure, the transmitter may further include a rectifying and filtering part configured to receive an input AC power and to generate a DC voltage; a DC/DC converter for regulating a level of the DC voltage outputted from the rectifying and filtering part to be outputted to the power conversion part; and a matching part for performing an impedance matching between the transmitter and the receiver, wherein the control part controls a DC voltage level of the DC/DC converter.

In the transmitter according to an embodiment of the present disclosure, there is provided a method for driving a wireless power transfer system that includes a transmitter having a power conversion part to convert power applied from an external power supply and a receiver to receive power from the transmitter, the method comprising allowing, when the receiver approaches a charging region of the transmitter, one of the transmitter and the receiver to sense the other one; allowing the receiver to request the transmitter to transfer power allowing a control part of the transmitter to regulate a DC voltage level of the DC/DC converter depending on the amount of power requested by the receiver; and allowing the control part to control the power conversion part depending on a duty ratio of a predetermined PWM control signal, wherein the duty ratio of the PWM control signal is determined by a duty ratio in which a ratio of the magnitude of an harmonic to the magnitude of a fundamental frequency among frequency components of an output signal of the power conversion part is a minimum.

In the transmitter according to another embodiment of the present disclosure, the harmonic may have the maximum magnitude of a plurality of harmonic components that have frequencies of the output signal different with one another.

In the transmitter according to another embodiment of the present disclosure, the power conversion part may include a full bridge inverter that receives a DC voltage from a DC/DC converter to output an AC signal.

In the transmitter according to another embodiment of the present disclosure, the duty ratio may be 26% to 44%.

In the transmitter according to another embodiment of the present disclosure, the duty ratio may be 41% or 32%.

In the transmitter according to another embodiment of the present disclosure, the control part may be fed back with an output signal outputted from the power conversion part and provides the power conversion part with a PWM control signal having a duty ratio in which a ratio of the magnitude of an harmonic to the magnitude of a fundamental frequency of the output signal is a minimum.

In the transmitter according to an embodiment of the present disclosure, there is provided a transmitter for generating a wireless power to be transmitted to a receiver, the transmitter comprising a control part for generating first to fourth AC power control signals; and a power conversion part for generating an AC power including a positive polarity electrode voltage and a negative polarity electrode voltage in response to the first to fourth AC power control signals, wherein the power conversion part generates the positive polarity electrode voltage in response to the first and fourth AC power control signals, and the negative polarity electrode voltage in response to the second and third AC power control signals.

In the transmitter according to another embodiment of the present disclosure, a duty ratio of the positive polarity electrode voltage may be determined by a falling time of the fourth AC power control signal, wherein a duty ratio of the negative polarity electrode voltage may be determined by a falling time of the third AC power control signal.

In the transmitter according to another embodiment of the present disclosure, the duty ratio may be regulated depending on a power receiving status of the receiver.

In the transmitter according to another embodiment of the present disclosure, the falling time of the fourth AC power control signal may be ahead of the falling time of the first AC power control signal.

In the transmitter according to another embodiment of the present disclosure, the falling time of the third AC power control signal may be ahead of the falling time of the second AC power control signal.

In the transmitter according to another embodiment of the present disclosure, the maximum AC power is generated when the duty ratio may be 50%, the magnitude of the AC power may be reduced when the duty ratio is decreased.

In the transmitter according to another embodiment of the present disclosure, the power conversion part may include first to fourth switching elements, the second and third switching elements may be turned off in a time interval when the first and fourth switching elements are turned on, and the first and fourth switching elements may be turned off in a time interval when the second and third switching elements are turned on.

Advantageous Effects

An embodiment of the present disclosure may change an AC power control signal to control an AC power generator depending on a receiving status of a receiver, and control a duty ratio of an AC voltage of an AC power outputted from an AC power generator in response to the change of the AC power control signal to control the magnitude of the AC power, thereby blocking an occurrence of current loss to prevent power from being wasted.

An embodiment of the present disclosure may solve obstacles such as power reception and noise due to harmonic components included in an output signal of a power conversion part of a transmission part for transmitting power, improve a harmonic distortion ratio by approximating an output waveform of the power conversion part to a sign wave using the power conversion part including a full bridge inverter as the embodiment, and provide a duty ratio that may measure a distribution of harmonic components of the output signal and minimize the harmonic components by feedbacking an output signal outputted from a power conversion part.

Meanwhile, a variety of other effects will be directly or suggestively disclosed in the detailed description according to embodiments described below.

BEST MODE

Figure 1:
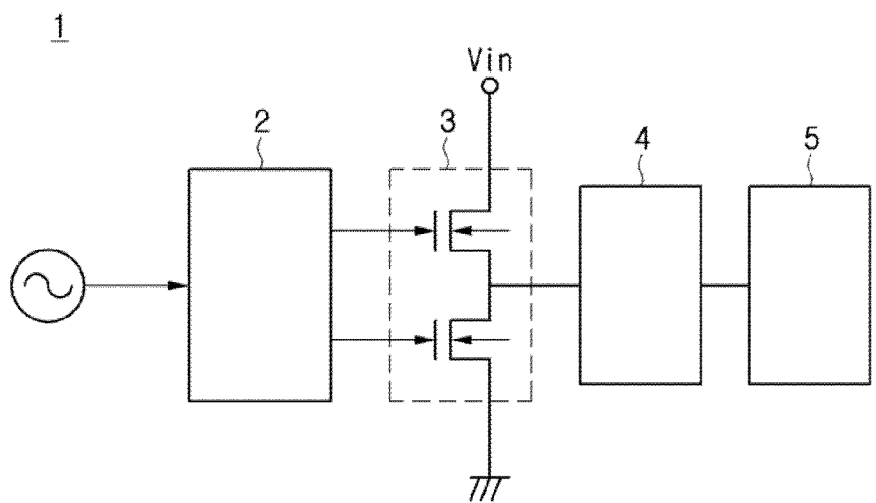
FIG. 1 is a block diagram of a transmitter for transmitting power in a conventional wireless power transfer system.

Hereinafter, a wireless power transfer device and a wireless power transfer system according to an embodiment of the present disclosure will be described in detail with reference to the accompanying drawings. Following embodiments are provided as examples to make those skilled in the art understand ideas of the present disclosure. Accordingly, the present disclosure may not be restricted to the following embodiments but concretely realized in other forms. In the drawings, further, the size and thickness of devices may be exaggeratedly expressed for the convenience of description. The same reference numerals are used to indicate the same or similar components throughout the specification.

Embodiments selectively use various kinds of frequency bands from a low frequency of 50 kHz to a high frequency of 15 MHz to transfer a wireless power, and it is needed to support a communication system in which data and control signals may be exchanged to control a system.

Embodiments may be applied to a variety of industrial fields that use electronic equipment which uses and needs batteries, such as mobile terminal industry, home appliance industry, electric automobile industry, medical device industry and robot industry.

Embodiments may consider a system that is capable of transferring power to a number of equipment using one transmission coil that provides an equipment.

Terms and abbreviations used in the embodiments are as follows.

Figure 2:
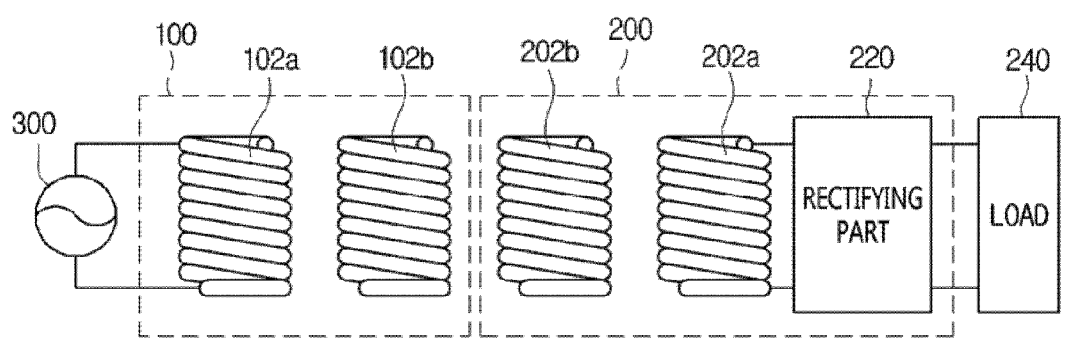
FIG. 2 is a view illustrating a wireless power transfer system according to an embodiment.

Wireless Power Transfer System: a system providing a wireless power transfer in a magnetic field region Wireless Power Transfer System-Charger: a device providing a wireless power transfer in a magnetic field region Wireless Power Transfer System-Device: a device to which a wireless power transfer is provided from a power transmitter in a magnetic field area Charging Area: a region where a practical wireless power transfer is performed in a magnetic field area, which may be changed depending on size, required power and operating frequency of an application product FIG. 2 is a view illustrating a wireless power transfer system according to an embodiment.

Referring to FIG. 1, a wireless power transfer system 10 according to an embodiment may include a power source 300, a transmitting part 100 which is a wireless power transfer device, a receiving part 200 which is a wireless power receiving device, and a load 240.

In the embodiment, the power source 300 may be included in the transmitter 100, which is not limited thereto. The transmitting part 100 may include a transmitting induction coil 102a and a transmitting resonance coil 102b.

The receiving part 200 may include a receiving resonance coil 202b, a receiving induction coil 202a and a rectifying part 220. Both ends of the power source 300 may be connected to both ends of the transmitting induction coil 102a, respectively. The transmitting resonance coil 102b may be disposed apart from the transmitting induction coil 102a in a predetermined distance. The receiving resonance coil 202b may be disposed apart from the receiving induction coil 202a in a predetermined distance. Both ends of the receiving induction coil 202a may be connected to both ends of the rectifying part 220, respectively. The load 240 may be connected to both ends of the rectifying part 220. In the embodiment, the load 240 may be included in the receiving unit 200.

The power generated in the power source 300 may be transferred to the transmitting part 100, and the power transferred to the transmitting part 100 may be transferred to the receiving part 200 that is resonated with the transmitting part 100 by a resonance phenomenon, that is, has the same resonance frequency as the transmitting part 100.

Hereinafter, a power transmission procedure may be described in more detail.

The power source 300 may generate an AC power having a predetermined frequency to transfer it to the transmitting part 100. The transmitting induction coil 102a and the transmitting resonance coil 102b may be inductively coupled each other. That is, an AC current is generated in the transmitting induction coil 102a by the AC power supplied from the power source 300, and an AC current may also be induced in the transmitting resonance coil 102b separated physically, by an electromagnetic induction caused by such an AC current. Then, the power transferred to the transmitting resonance coil 102b may be transmitted to the receiving part 200 having the same resonance frequency as that of the transmitting part 100 using a frequency resonance scheme.

Power may be transferred between two impedance-matched LC circuits by resonance. The power transfer by resonance makes it possible to transfer power farther and at a higher transfer efficiency, compared with a power transfer by an electromagnetic induction scheme.

The receiving resonance coil 202b may receive the power that is transferred from the transmitting resonance coil 102b using a frequency resonance scheme. An AC current may flow in the receiving resonance coil 200b due to the received power, and the power transferred to the receiving resonance coil 202b may be transferred to the receiving inductance coil 202a that is inductively coupled with the receiving resonance coil 202b by an electromagnetic induction. The power transferred to the receiving induction coil 202a may be rectified by the rectifying part 220 to be transferred to the load 240.

In the embodiment, the transmitting induction coil 102a, the transmitting resonance coil 102b, the receiving resonance coil 202b and the receiving induction coil 202a may have a spiral or helical structure, which are not limited thereto.

The transmitting resonance coil 102b and the receiving resonance coil 202b may be resonantly coupled each other so as to transfer power in a resonance frequency. Due to the resonance coupling between the transmitting resonance coil 102b and the receiving resonance coil 202b, a power transfer efficiency between the transmitting resonance coil 102b and the receiving resonance coil 202b may be considerably enhanced.

The wireless power transfer system has described a power transfer in the resonance frequency scheme.

The embodiment may also be applied to the power transfer in the electromagnetic induction scheme other than in the resonance frequency. That is, when the wireless power transfer system performs the power transfer based on an electromagnetic induction according to the embodiment, the transmitting resonance coil 102b included in the transmitting part 100 and the receiving resonance coil 202b included in the receiving part 200 may be omitted.

A quality factor and a coupling coefficient may have a significant meaning in the wireless power transfer. That is, a power transfer efficiency may have a proportional relationship with each of the quality factor and the coupling coefficient. Accordingly, as a value of at least one of the quality factor and the coupling coefficient becomes great, a power transfer efficiency may be enhanced. The quality factor may mean an index of energy accumulated near the transmitting part 100 or the receiving part 200. The quality factor may be changed depending on an operating frequency (w) and a shape, dimension and material of coil. The quality factor may be expressed in the following equation 1.

$$Q = w*L/R \quad \text{[Equation 1]}$$

L is an inductance of a coil, and R means a resistance corresponding to a power loss amount occurring in the coil itself. The quality factor may have a value from zero (0) to infinity, and the higher the quality factor is, the more the power transfer efficiency between the transmitting part 100 and the receiving part 200 is enhanced. The coupling coefficient means a degree of coupling between a coil of a transmitting side and a coil of a receiving side, having a range from zero (0) to one (1). The coupling coefficient may be changed depending on a relative position or distance between the coil of the transmitting side and the coil of the receiving side.

Figure 3:
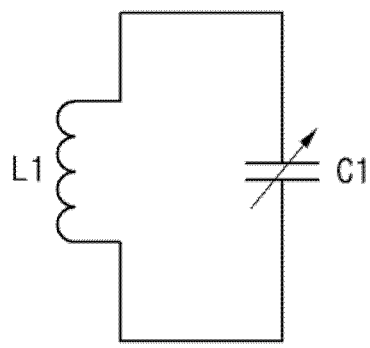
FIG. 3 is an equivalent circuit diagram of a transfer induction coil according to an embodiment.

FIG. 3 is an equivalent circuit diagram of a transfer induction coil according to an embodiment.

As illustrated in FIG. 3, the transmitting induction coil 102a may be configured of an inductor L1 and a capacitor C1, which may configure a circuit having a suitable inductance value and a suitable resistance value. The transmitting induction coil 102a may be configured with an equivalent circuit in which both ends of the inductor L1 are connected to both ends of the capacitor C1, respectively. That is, the transmitting induction coil 102a may be configured with an equivalent circuit in which the inductor L1 and the capacitor C1 are connected in parallel. The capacitor C1 may be a variable capacitor, so that an impedance matching is performed by controlling a capacitance of the capacitor C1. An equivalent circuit of the transmitting resonance coil 102b, the receiving resonance coil 202b and the receiving induction coil 202a may also be the same as or similar to that illustrated in FIG. 2, which is not limited thereto.

Figure 4:
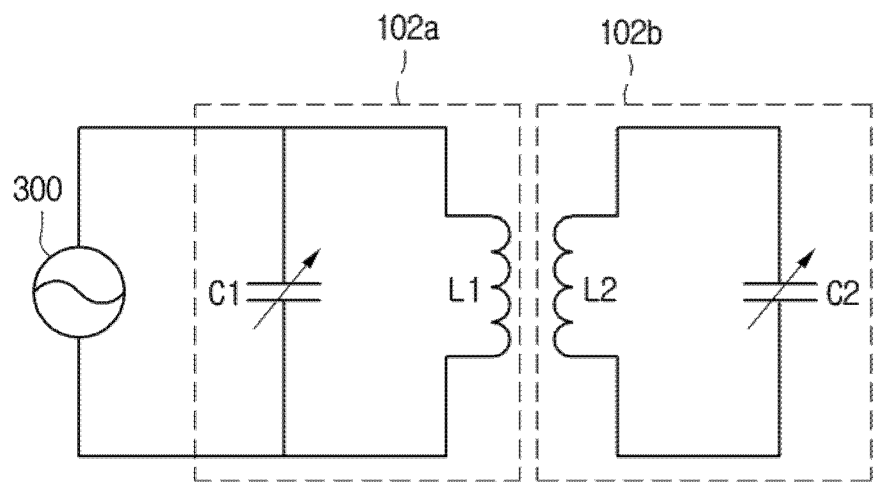
FIG. 4 is an equivalent circuit diagram of a power source and a wireless transfer device according to an embodiment.

FIG. 4 is an equivalent circuit diagram of a power source and a wireless transfer device according to an embodiment.

As illustrated in FIG. 4, the transmitting induction coil 102a and the transmitting resonance coil 102b may be configured with the inductors L1 and L2 and the capacitors C1 and C2, respectively, the inductors and capacitors having their inductance values and capacitance values, respectively.

Figure 5:
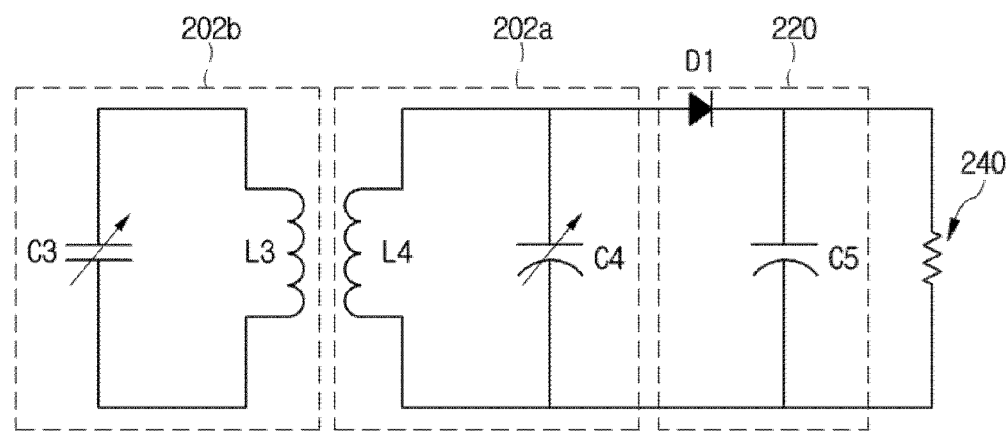
FIG. 5 is an equivalent circuit diagram of a receiver according to an embodiment.

FIG. 5 is an equivalent circuit diagram of a receiver according to an embodiment.

As illustrated in FIG. 5, the receiving resonance coil 202b and the receiving resonance coil 202a may be configured with inductors L3 and L4 and capacitors C3 and C4, respectively, the inductors and capacitors having their inductance values and capacitance values, respectively. The rectifying part 220 may convert an AC power transferred from the receiving inductance coil 202a into a DC power to transfer the converted DC power to the load 240. In more detail, the rectifying part 220 may include a rectifier and a smoothing circuit, which are not illustrated. In the embodiment, the rectifier may be a silicon rectifier that may be equalized with a diode D1 as illustrated in FIG. 5, which is not limited thereto. The rectifier may convert an AC power transferred from the receiving induction coil 202a into a DC power.

The smoothing circuit may remove an AC component included in the DC power converted in the rectifier and output a smooth DC power. In the embodiment, the smoothing circuit may employ a rectifying capacitor C5 as illustrated in FIG. 5, which is not limited thereto.

A DC power transferred from the rectifying part 220 may be a DC voltage or a DC current, which is not limited thereto.

The load 240 may be an arbitrary charger or device that needs a DC power. For example, the load 240 may mean a battery.

The receiving part 200 may be mounted on an electronic equipment that needs a power, such as a mobile phone, a laptop computer, a mouse, etc. Accordingly, the receiving resonance coil 202b and the receiving inductance coil 202a may have a shape adapted to that of the electronic equipment.

The transmitting part 100 may exchange information using an in-band or out-of-band communication with the receiving part 200.

The in-band communication may mean a communication scheme to exchange information between the transmitting part 100 and the receiving part 200 using signals having a frequency used for a wireless power transfer. For this, the receiving part 200 may further include a switch, and may or may not receive the power transmitted from the wireless power transfer device 200 through a switching operation of the switch. Accordingly, the transmitting part 100 may detect the amount of power consumed in the transmitting part 100 to recognize an on or off signal of the switch included in the receiving part 200.

In more detail, the receiving part 200 may change the amount of power absorbed in a resistor element using the resistor element and a switch, capable of changing the amount of power consumed in the receiving part 200. The transmitting part 100 may sense changes of power consumed and obtain status information of the load 240. The switch and resistor element may be serially connected. In the embodiment, the status information of the load 240 may include a current charging amount and a charging amount development of the load 240. The load 240 may be included in the receiving part 200.

In more detail, when the switch is opened, the power absorbed by the resistor element becomes zero (0), and the power consumed in the receiving part 200 is also reduced.

When the switch is shorted, the power absorbed by the resistor element becomes more than zero (0), and the power consumed in the transmitting part 100 is increased. When such operations repeat in the receiving part 200, the transmitting part 100 may detect the power consumed in the transmitting part 100 and perform a digital communication with the receiving part 200.

The transmitting part 100 may receive status information of the load 240 by the operations described above, and transmit a suitable power.

On the contrary, with a resistor element and a switch included in the transmitting part 100, it may be possible to transfer the status information of the transmitting part 100 to the receiving part 200. In the embodiment, the status information of the transmitting part 100 may include the maximum providing the amount of power that is transferred by the transmitting part 100, the number of the receiving parts 200 to which the transmitting part 100 provides the power, and available amount of power of the transmitting part 100.

Next, the out-of-band communication will be describe.

The out-of-band communication refers to a communication scheme in which information needed when transferring power is exchanged using a separate frequency band other than a resonance frequency band. An out-of-band communication module is mounted on both the transmitting part 100 and the receiving part 200, so that they may exchange information needed to transfer power. The out-of-band communication module may be mounted on the power source 300, which is not limited thereto. In the embodiment, the out-of-band communication module may use a local area communication scheme such as blueTooth, Zigbee, wireless LAN and NFC, which is not limited thereto.

Hereinafter, a subsystem of the transmitting part 100 and the receiving part 200 of a wireless power transfer system 10 will be described in detail.

Figure 6:
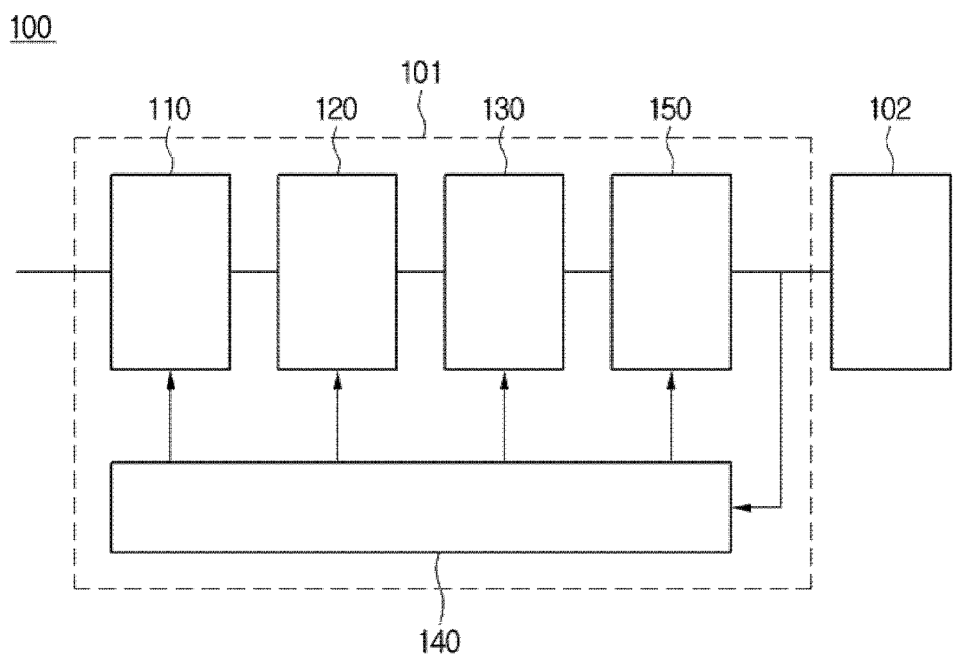
FIG. 6 is a block diagram illustrating a transmitter of a wireless power transfer system according to an embodiment of the present disclosure.
Figure 7:
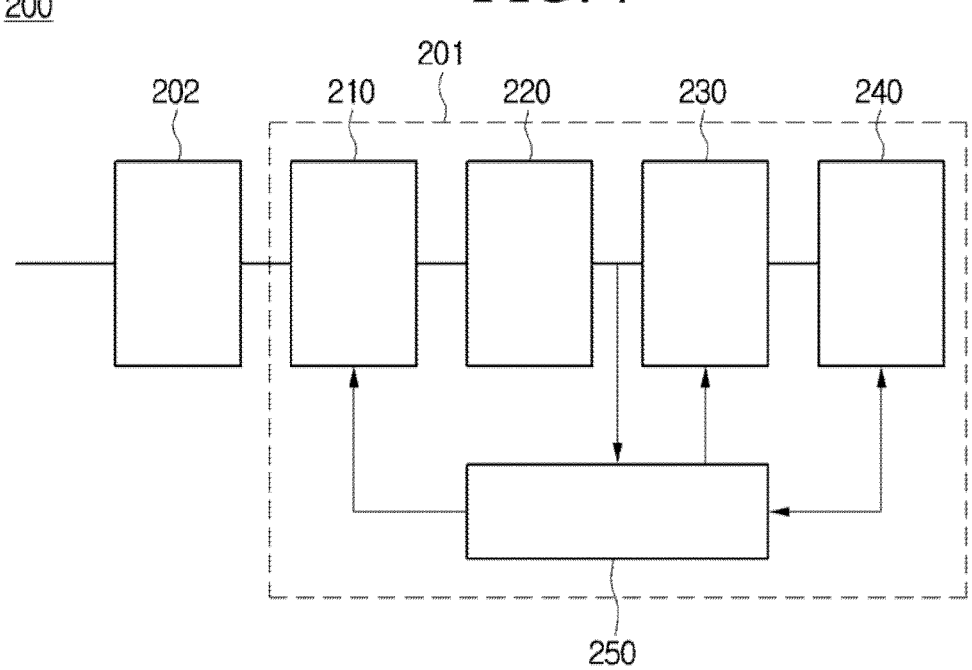
FIG. 7 is a block diagram illustrating a receiver of a wireless power transfer system according to an embodiment of the present disclosure.

FIG. 6 is a block diagram illustrating a transmitter of a wireless power transfer system according to an embodiment of the present disclosure, and FIG. 7 is a block diagram illustrating a receiver of a wireless power transfer system according to an embodiment of the present disclosure.

Referring to FIGS. 6 and 7, the wireless power transfer system 10 according to an embodiment of the present disclosure may include a transmitting part 100 transmitting power in a wireless manner and a receiving part 200 receiving power from the transmitting part 100.

On reviewing a block diagram of a subsystem of the transmitting part 100 illustrated in FIG. 6, the subsystem of the transmitting part 100 may include a transmitting power converter system 101 and a transfer antenna system 102.

The transmitting power converter system 101 may include a number of subsystems, including a rectifying and filtering part 110, a converter 120, a power converting part 130, a control part 140 and a matching part 150.

The rectifying and filtering part 110 generates a DC voltage to be used in the next stage, and the generated DC voltage is supplied to the converter 120 and then to the transmitting antenna system 120.

The converter 120 together with the rectifying and filtering part 110 is configured of an AC/DC converter, which may rectify an AC voltage having a band of tens of Hz to generate a DC voltage.

Further, the converter 120 is configured independently from the rectifying and filtering part 110 to be a DC/DC converter that generates a DC voltage suitable to a power transfer. Also, the converter 120 may be a step-down converter to provide an output DC voltage that is lower than an input voltage, which is not limited thereto.

The converter 120 may output a DC voltage whose voltage level is controlled by the control part 140.

The power conversion part 130 may convert a DC voltage of a certain level into an AC voltage by a switching pulse signal of tens of KHz to tens of MHz, generating power. That is, the power conversion part 130 may convert a DC voltage into an AC voltage, generating a target, that is, "a wake-up voltage' or "a charging power" that is used in eh receiving part 200 which is brought into a charging region.

Here, the wake-up power means a small power of 0.1 to 1 mWatt, and the charging power is a power that is needed to charge a battery of the receiving part 200 or consumed when operating the receiving part 200, indicating a large power of 1 mWatt to 200 Watt consumed in a load of the target receiving part 200.

Meanwhile, the power conversion part 130 may include a power amplifier that amplifies a DC voltage according to a switching pulse signal.

The power conversion part 130 may be configured of a full bridge inverter.

The control part 140 may generate a frequency and a switching waveforms to drive the power conversion part 130 in consideration of the maximum power transfer efficiency, controlling the power to be transferred.

The matching part 150 performs an impedance matching between the transmitting part 100 and the receiving part 200.

The transmitting antenna system 102 may include at least one of the inductance coil 102a and the resonance coil 102b.

When the wireless power transfer system 10 transfers power only in a magnetic induction scheme, the transmitting antenna system 102 may include the induction coil 102a only. When the wireless power transfer system 10 transfers power only in a magnetic resonance scheme, the transmitting antenna system 102 may include the resonance coil 102b only. Also, when the wireless power transfer system 10 transfers power in mixed schemes of the magnetic induction scheme and the magnetic resonance scheme, the transmitting antenna system 102 may include both the induction coil 102a and the resonance coil 102b.

Further, the induction coil 102a or the resonance coil 102b may be included in a single or in plural. When the induction coil 102a or the resonance coil 102b are included in plural, they may be disposed in an overlapping manner and an overlapping area may be determined in consideration of a deviation of magnetic flux.

The receiving part 200 illustrated in FIG. 7 may include a receiving power converter system 201 and a receiving antenna system 202.

The receiving antenna system 202 of the receiving part 200 may be the same as the transmitting antenna system 102, and dimensions of the receiving antenna may be changed depending on electrical characteristics of the receiving part 200.

Further, the receiving antenna system 202 may receive power in the magnetic induction scheme or magnetic resonance scheme. As such, the receiving antenna system 202 may include at least one of the induction coil 202*a* and the resonance coil 202*b* depending on the power receiving scheme. Also, the receiving antenna system 202 may further include a near field communication antenna.

The receiving power converter system 201 may include a matching part 210, a rectifying part 220, a receiving side converter 230, a load 240 and a receiving side controller 250.

The matching part 210 performs an impedance matching between the transmitter 100 and the receiver 200.

The rectifying part 220 rectifies an AC voltage outputted from the receiving antenna system 202 to generate a DC voltage.

The receiving side converter 230 may be configured of a DC/DC converter to control a level of the DC voltage outputted from the rectifying part 220 according to a load capacity.

The load 240 may include a battery, a display device, a sound output circuit, a main processor and kinds of sensors.

The receiving side control part 250 may be activated by a wake-up power from the transmitting part 100, perform a communication with the transmitting part 100, and control an operation of the subsystem of the receiving part 200.

The receiving part 200 may be configured in a single or in plural, to simultaneously receive energy from the transmitting part 100 in a wireless manner. That is, in the wireless power transfer system employing the resonance scheme, a plurality of target receiving parts 200 may be supplied with power from one transmitting part 100.

Here, the matching part 150 of the transmitting part 100 may adaptively perform an impedance matching among a plurality of receiving parts 200.

Meanwhile, when the receiving part 200 is configured in plural, they may become the same kind of system or different kinds of system.

Meanwhile, the control part 140 of the transmitting part 100 may generally control the transmitting part 100. The control part 140 may control the power conversion part 130.

The control part 140 may control the power conversion part 130 depending on statuses of the receiving part 200, that is, a charging status or a receiving status. For example, when the receiving part 200 requires a higher wireless power, the control part 140 may control the power conversion part 130 to generate a higher wireless power to be transmitted to the receiving part 200. For example, when the receiving part 200 requires a lower wireless power, the control part 140 controls the power conversion part 130 to generate a lower wireless power to be transmitted to the receiving part 200.

The status of the receiving part 200 may be provided from the receiving part 200 in response to a request of the transmitting part 100. On the other hand, information on the status of the receiving part 200 may be provided to the transmitting part 100 arbitrarily or in a predetermined interval.

The control part 140 may supply the power conversion part 130 with a PWM control signal whose duty ratio is controlled according to statuses of the receiving part 200 based on status information provided from the receiving part 200. Accordingly, the embodiment may regulate a control signal used to generate an AC power instead of regulating the magnitude of the power of the power source 300 or the output of the converter 120 in order to regulate an AC power to be transmitted to the receiving part 200 so as to change the magnitude of the AC power, preventing current from being lost and power from being wasted, thereby enhancing power transfer efficiency.

<Power Conversion Part of Wireless Power Transfer System According to an Embodiment of the Present Disclosure>

Figure 8:
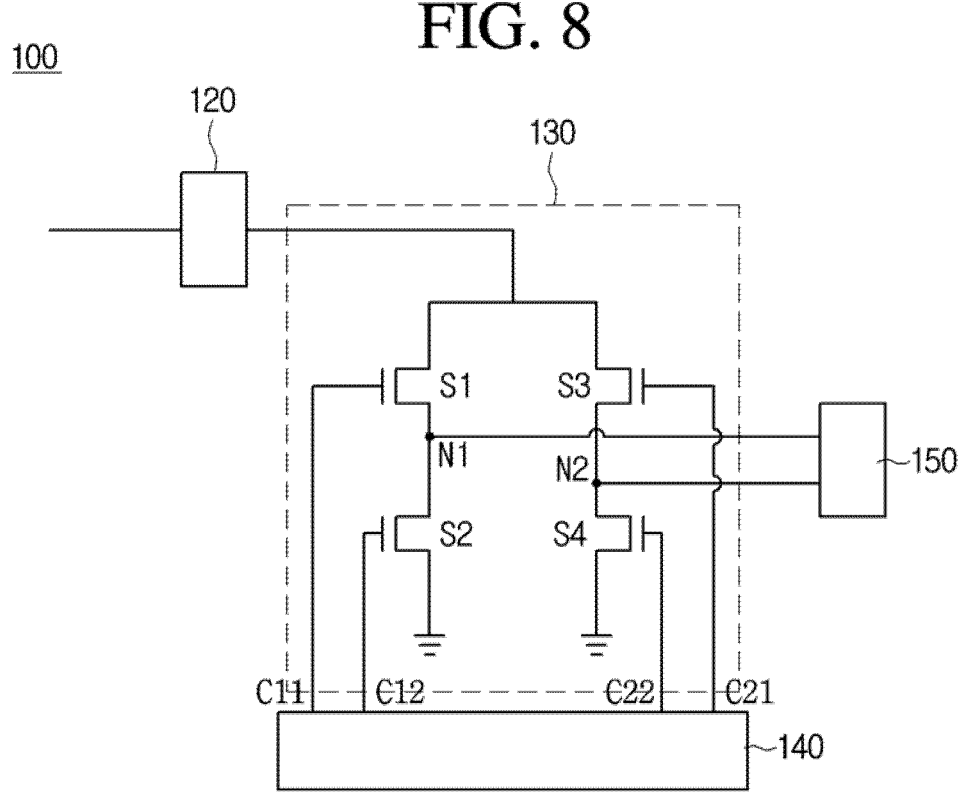
FIG. 8 is a view illustrating a light device according to an embodiment.

FIG. 8 is a view illustrating a light device according to an embodiment.

A connection relationship and an operation method of the power conversion part 130 will be described with reference to FIG. 8.

The power conversion part 130 may convert power provided from the converter 120 into an AC power based on an AC power control signal provided from the control part 140 and amplify it. Also, the power conversion part 130 may include a full bridge inverter.

The power conversion part 130 may include a first to a fourth switching elements S1, S2, S3 and S4.

The first to fourth switching elements S1, S2, S3 and S4 each may conduct when a first to a fourth AC power control signals C11, C12, C21 and C22 provided from the control part 140 are in a high level, and open when in a low level.

The first switching element S1 may be connected between a first node N1 and the converter 120, and controlled by a first AC power control signal C11 of the control part 140. Also, the second switching element S2 may be connected between the first node N1 and a ground and controlled by a second AC power control signal C12 of the control part 140.

The third switching element S3 may be connected between the second node N2 and the converter 120, and controlled by a third AC power control signal C21 of the control part 140. Also, the fourth switching element S4 may be connected between the second node N2 and a ground, and controlled by a fourth AC power control signal C22 of the control part 140.

The first to fourth switching elements S1, S2, S3 and S4 may be N-type MOSFET (Metal-Oxide-Semiconductor Field-Effect-Transistor), which is not limited thereto. Rather, elements that perform a switching operation by the AC power control signal of the control part 140 may be available.

Meanwhile, when the first to fourth switching element S1, S2, S3 and S4 are a transistor that is a device having three terminals, each gate terminal of the first to fourth switching elements S1, S2, S3 and S4 is applied an AC power control signal. Remaining two terminals of the first to fourth switching elements S1, S2, S3 and S4 may be source and drain terminals and current may flow from the drain terminal to the source terminal in the first to fourth switching elements S1, S2, S3 and S4.

<Operation Scheme of Power Conversion Part According to an Embodiment of the Present Disclosure>

Figure 9:
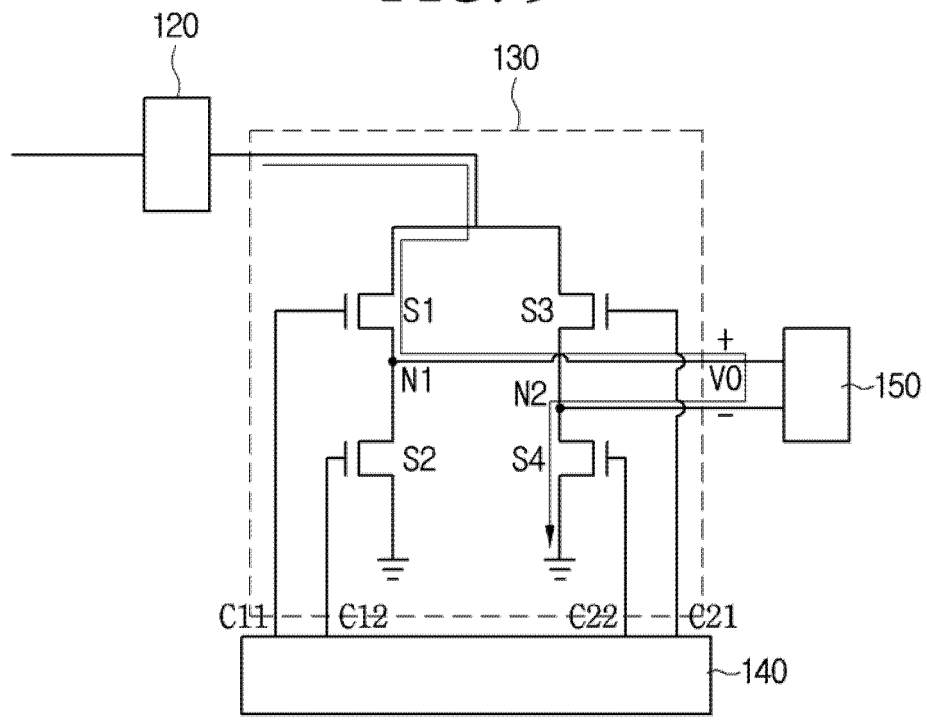
FIGS. 9 and 10 are views illustrating operations of a power conversion part.
Figure 10:
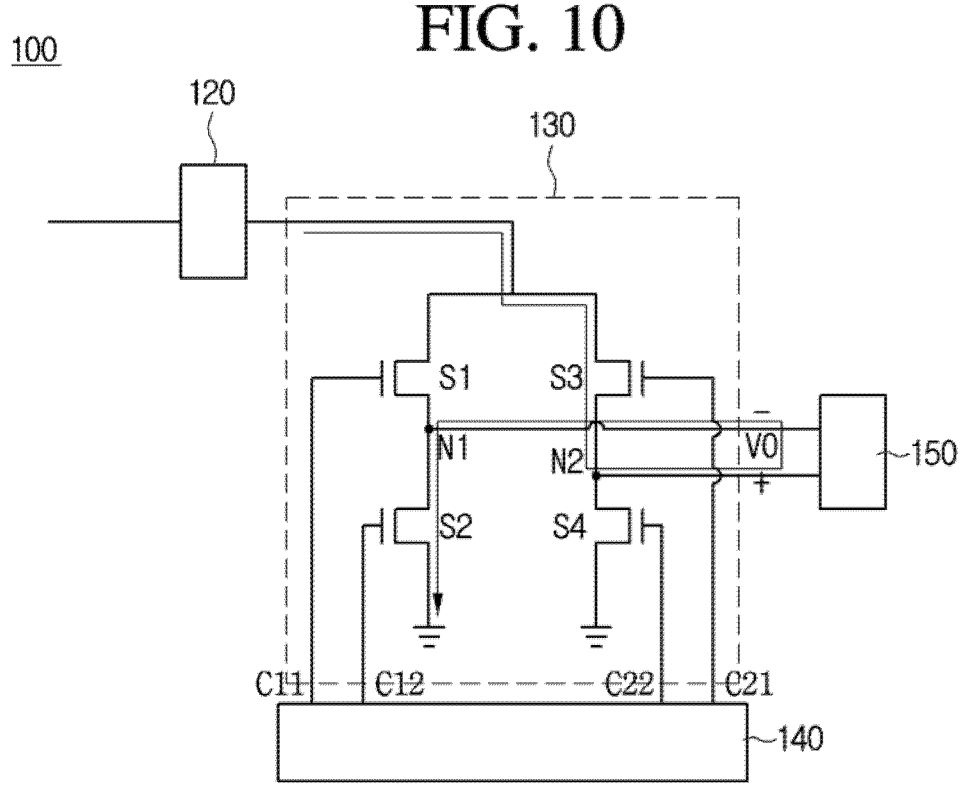
Figure 11:
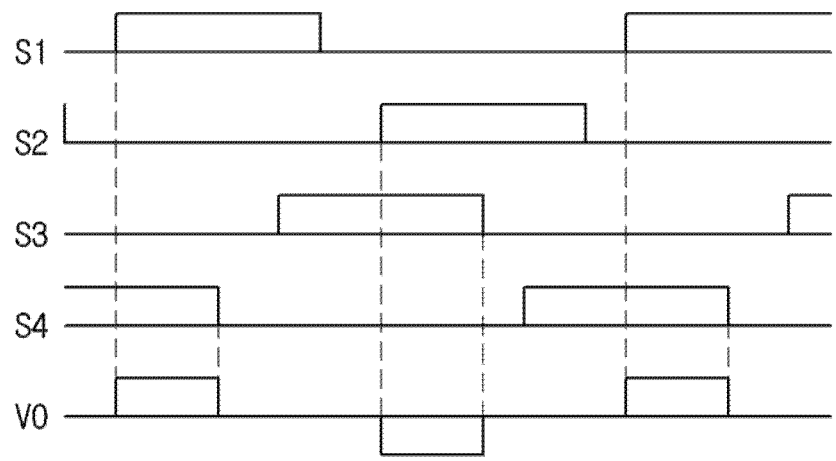
FIG. 11 is a waveform view of an output signal of a power conversion part according to an AC power control signal.

FIGS. 9 and 10 are views illustrating operations of a power conversion part, and FIG. 11 is a waveform view of an output signal of a power conversion part according to an AC power control signal.

An operation scheme of the power conversion part 130 will be described with reference to FIGS. 9 to 11.

As illustrated in FIG. 9, when the first and fourth switching elements S1 and S4 are turned on by the first and fourth AC power control signals C11 and C22 that are PWM control signals provided from the control part 140 and the second and third switching elements S2 and S3 are turned off by the second and third AC power control signals C12 and C21, a positive polarity output voltage Vo may be applied to the matching part 150. As illustrated in FIG. 10, when the first and fourth switching elements S1 and S4 are turned off by the first and fourth AC power control signals C11 and C22 provided from the control part 140 and the second and third switching elements S2 and S3 are turned on by the second and third AC power control signals C12 and C21, a negative polarity output voltage Vo may be applied to the matching part 150.

FIG. 11 shows the first to fourth AC power control signals C11, C12, C21 and C22 applied to the first to fourth switching elements S1, S2, S3 and S4 and a resultant output voltage Vo when a duty ratio is 50%, for example. Here, there may exist a blank interval where the first and second AC power control signals C11 and C12 to control the first and second switching elements S1 and S2 and the third and fourth AC power control signals C21 and C22 to control the third and fourth switching elements S3 and S4 are not overlapped each other. It is for the purpose of preventing an output voltage Vo of the converter 120 from not appearing due to the fact that when the first and second switching elements S1 and S2 are simultaneously turned on so that they are conductively connected, or the third and fourth switching elements S3 and S4 are simultaneously turned on so that they are conductively connected, the output voltage of the converter 120 is grounded.

<Duty Ratio Regulation Using a Blank Interval Regulation>

Figure 12:
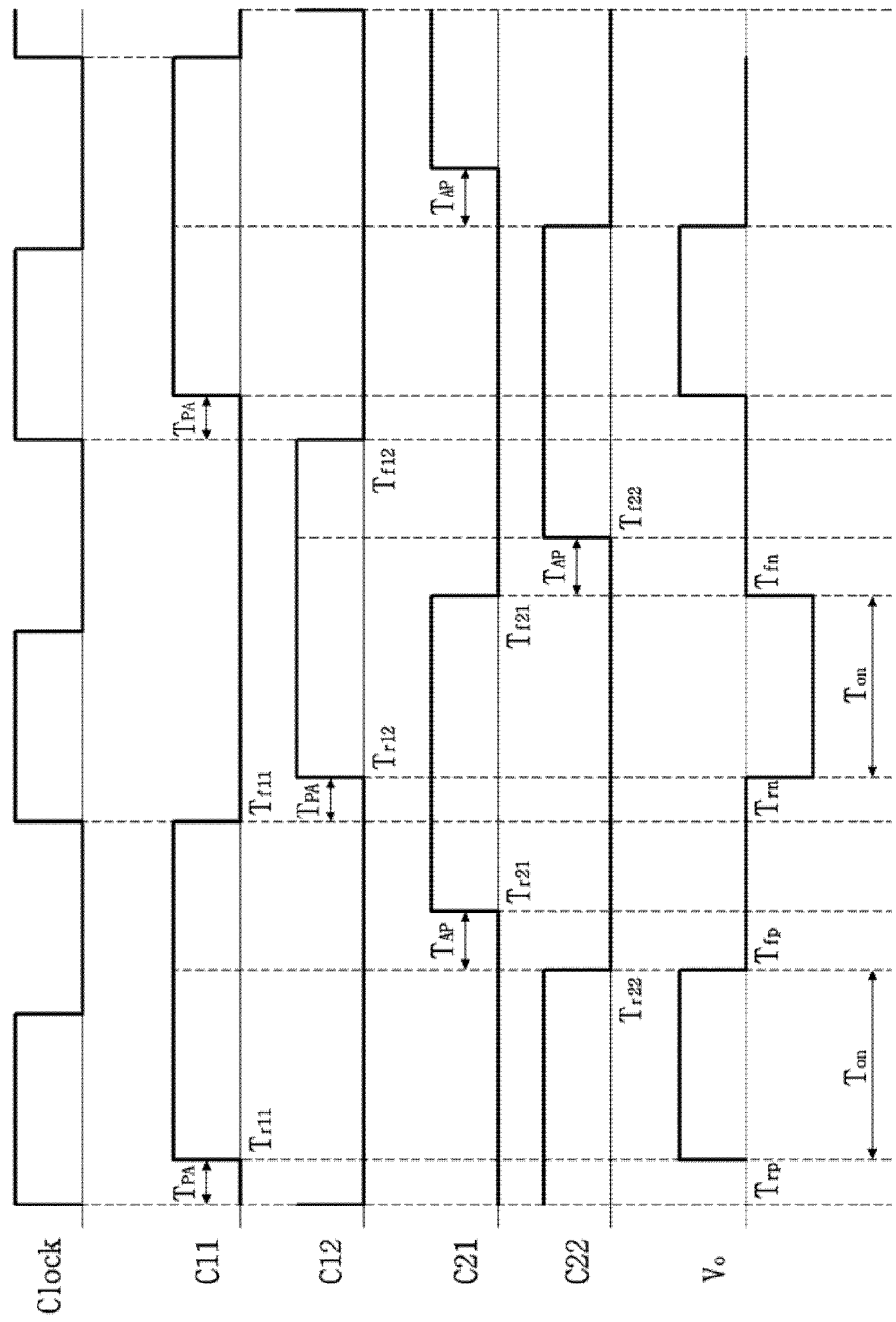
FIGS. 12 and 13 are views illustrating waveform diagrams to control a duty ratio of an AC voltage by controlling a blank interval.
Figure 13:
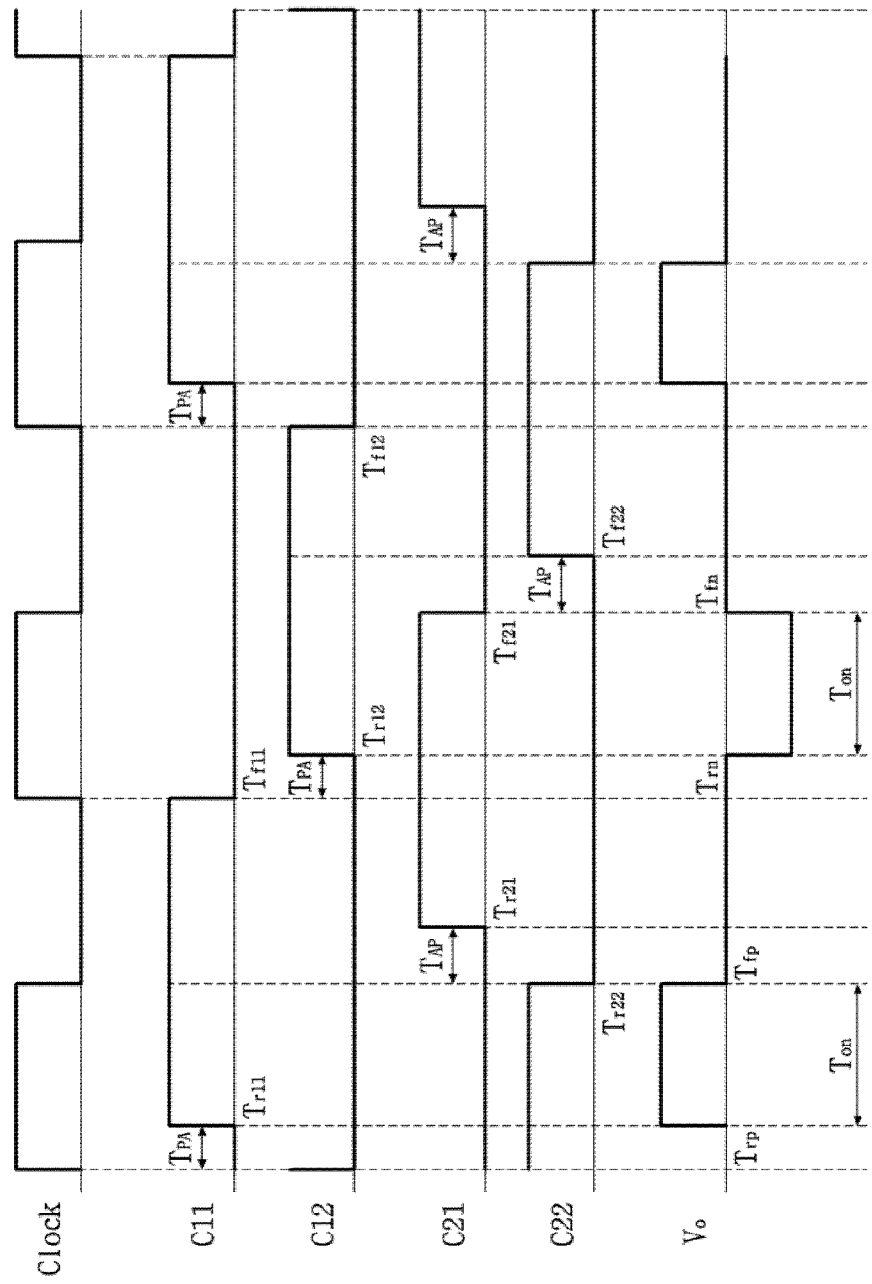

FIGS. 12 and 13 are views illustrating waveform diagrams to control a duty ratio of an AC voltage by controlling a blank interval.

As illustrated in FIGS. 12 and 13, duty ratios of the first to fourth AC power control signals C11, C12, C21 and C22 that are PWM signals provided from the control part 140 may be changed. For example, rising times Tr11 Tr12, Tr21 and Tr22 and falling times Tf11, Tf12 Tf21 and Tf22 of high levels of the first to fourth AC power control signals C11, C12, C21 and C22 that are PWM signals provided from the control part 140 may be changed. In response to the first to fourth AC power control signals C11, C12, C21 and C22 that are changed, conduction times of the first to fourth switching elements S1, S2, S3 and S4 are changed and resultantly a duty ratio Ton of the AC voltage Vo of the AC power supplied to the transmitting antenna system 102 may be changed.

The embodiment may enable the receiving part 200 to receive a constant power by differing a duty ratio Ton of the AC voltage Vo of the AC power depending on a status of the receiving part 200, for example, a charging status and/or a receiving status.

In addition, the embodiment may interrupt the current that may be lost when an AC power is generated in the transmitting part 100, minimizing power consumption.

FIG. 12 illustrates waveform diagrams of the first to fourth AC power control signals that are PWM signals to generate an AC power having an AC voltage of 50% duty ratio.

As illustrated in FIG. 12, the first to fourth AC power control signals C11, C12, C21 and C22 may be generated based on clock signals.

The clock signal (Clock) may be generated based on ban AC signal of an oscillator (not illustrated) or by a separate means, which is not limited thereto.

The clock signal (Clock) may be repeatedly generated in a cycle having a high level pulse and a low level pulse.

For example, the first AC power control signal C11 defines a rising time Tr11 for a high level at a time delayed for a predetermined time from a rising time of a first high level pulse in the clock signal (Clock) and a falling time Tf11 for a low level at a rising time of a second high level pulse.

For example, a high level section of the second AC power control signal C12 is not overlapped with a high level section of the first AC power control signal C11. If the high level section of the first AC power control signal C11 is overlapped with the high level section of the second AC power control signal C12, the first and second switching elements S1 and S2 are simultaneously conducted, an output voltage of the converter 120 is discharged to a ground, the output voltage of the converter 120 is not applied to the first node N1. As a result, power is not transferred to the transfer antenna system 102. Accordingly, a blank interval $T_{PA}$ may be defined where high level intervals of the first and second AC power control signals C11 and C12 do not exist between the falling time Tf11 of the first AC power control signal C11 and the rising time Tr12 of the second AC power control signal C12 or between the rising time Tr11 of the first AC power control signal C11 and the falling time Tf12 of the second AC power control signal C12.

The second AC power control signal C12 may define a rising time Tr12 for a high level at a time delayed for a predetermined time from a rising time of a second high level in the clock signal (Clock) and a falling time Tf12 for a low level at a rising time of a third high level pulse.

For example, a high level interval of the third AC power control signal C21 may be partially overlapped with a high level interval of the first AC power control signal C11 and a high level interval of the second AC power control signal C12. That is, the rising time Tr21 of the third AC power control signal C21 is ahead of a falling time Tf11 of the first AC power control signal C11, and the falling time Tf21 of the third AC power control signal C21 follows the rising time Tr12 of the second AC power voltage signal C12.

For example, a high level interval of the fourth AC power control signal C22 is not overlapped with a high level interval of the third AC power control signal C21. Likewise, when the high level interval of the third AC power voltage signal C21 is overlapped with the high level interval of the fourth AC power control signal C22, the third and fourth switching elements S3 and S4 are simultaneously conducted, an output voltage of the converter 102 is discharged to a ground and the output voltage of the converter 120 is not applied to the second node N2. As a result, power is not transferred to the transfer antenna system 102. Accordingly, a blank interval $T_{AP}$ may be defined where high level intervals of the third and fourth AC power control signals C21 and C22 do not exist between a falling time Tf21 of the third AC power control signal C21 and a rising time Tr22 of the fourth AC power control signal C22 or between a rising time Tr21 of the third AC power control signal C21 and a falling time Tf22 of the fourth AC power control signal C22.

In addition, the high level interval of the fourth AC power control signal C22 may be partially overlapped with the high level interval of the first AC power control signal C11 and a high level interval of the second AC power control signal C12. That is, the rising time Tr22 of the fourth AC power control signal C22 is ahead of a falling time Tf12 of the second AC power control signal C12, and follows the rising time Tr11 of the first AC power voltage signal C11.

Respective high level intervals of the first to fourth AC power control signals C11, C12, C21 and C22 may be defined in a cycle of the clock signal (Clock).

Meanwhile, an high level overlapping interval of the first and fourth AC power control signals C11 and C22 is a power transfer interval, which may be defined as a duty ratio (Ton).

The duty ratio (Ton) is an interval where a power may be transferred for a cycle, the maximum being set 50%, which is not limited thereto. For example, when a duty ratio is 50%, power can be transferred in a half cycle and cannot be transferred in the reaming half cycle. Further, an overlapped high level interval of the second and third AC power control signals C12 and C21 is a power transfer available interval, which may be defined as a duty ratio (Ton).

In FIG. 12, it may be understood that the duty ratio (Ton) is determined the falling time Tf21 of the third AC power control signal C21 and the falling time Tf22 of the fourth AC power control signal C22. When the falling time Tf22 is delayed, the duty ratio Ton may be increased, and when the falling time is quickened, the duty ratio Ton may be decreased.

When the duty ratio Ton is increased, since an AC power transferred to the transmitting antenna system 102 is increased, a wireless power received by the receiving part 200 may also be decreased. When the duty ratio Ton is decreased, since the AC power transferred to the transmitting antenna system 102 is decreased, a wireless power received by the receiving part 200 may also be decreased.

The embodiment may reflect an increase or decrease of the AC power to be transferred to the receiving part 200 so that the control part 140 generates the first to fourth AC power control signals C11, C112, C21 and C22, a duty ratio (Ton) of an AC voltage (Vo) output from the power conversion part 130 may be regulated by the first to fourth AC power control signals C11, C12, C21 and C22, and the wireless power having an AC voltage (Vo) of the regulated duty ratio (Ton) may be transmitted to the receiving part 200 by the transmitting antenna system 102.

FIG. 13 illustrates a waveform diagram of the first to fourth AC power control signals to generate an AC power having an AC voltage of 30% duty ratio.

In FIG. 13, a method for generating the first to fourth AC power control signals C11, C12, C21 and C22 is the same as that described with reference to FIG. 8.

An AC voltage (Vo) illustrate in FIG. 13 has a duty ratio (Ton) of 30%, which is smaller than the duty ratio (To) of 50% illustrated in FIG. 12. In other word, a width of a positive polarity voltage or a negative polarity voltage having a duty ratio (To) of 30% may be smaller than that of a positive polarity voltage or a negative polarity voltage having a duty ratio (To) of 50%.

As such, the first to fourth AC power control signals C11, C12, C21 and C22 may be changed so that the duty ratio of the AC voltage (Vo) may be reduced to 30%. That is, the falling time Tf12 of the second AC power control signal C12 and the falling time Tf21 of the third AC power control signal C21 illustrated in FIG. 13 may be ahead of the falling time Tf12 of the second AC power control signal C12 and the falling time Tf21 of the third AC power control signal C21 illustrated in FIG. 12. Accordingly, as the duty ratio (Ton) of the AC voltage Vo is reduced, the falling time Tf12 of the second AC power control signal C12 and the falling time Tf21 of the third AC power control signal C21 may be quickened more and more. For example, the falling time Tf12 of the second AC power control signal C12 and the falling time Tf21 of the third AC power control signal C21 may be more quickened in a duty ratio (Ton) of 20% rather than a duty ratio (Ton) of 30%.

Meanwhile, the control part 140 may include a first serve control part that generates the first to fourth AC power control signals C11 to C22 that are PWN signals, to be provided to the first to fourth switching elements S1 to S4 and a second serve control part that provides the first serve control part with a duty ratio regulation signal to regulate duty ratios of the first to fourth AC power control signals C11 to C22.

The second serve control part may supply the first serve control part with a duty ratio regulation signal regulated depending on a status of the receiving part 200 based on status information provided from the receiving part 200.

For example, the duty ratio regulation signal may be a binary data of 6 bits. For example, when the duty ratio regulation signal is 000001, the first serve control part may generate the first to fourth AC power control signals C11 to C22 to generate an AC power having an AC voltage of a duty ratio of 50% in response to the duty ratio regulation. The AC power having the AC voltage of a duty ratio of 50% may be the maximum AC power to be transmitted to the receiving part 200, which is not limited thereto.

For example, when a duty ratio regulation signal is 000010, the first serve control part may generate the first to fourth AC power control signals C11 to C22 to generate an AC power having an AC voltage of a duty ratio of 40% in response to the control signal.

For example, when a duty ratio regulation signal is 000011, the first serve control part may generate the first to fourth AC power control signals C11 to C22 to generate an AC power having an AC voltage of a duty ratio of 30% in response to the control signal.

For example, when a duty ratio regulation signal is 000100, the first serve control part may generate the first to fourth AC power control signals C11 to C22 to generate an AC power having an AC voltage of a duty ratio of 20% in response to the control signal.

For example, when a duty ratio regulation signal is 000101, the first serve control part may generate the first to fourth AC power control signals C11 to C22 to generate an AC power having an AC voltage of a duty ratio of 10% in response to the control signal.

In addition, by setting the duty ratio regulation signal with a binary data of 6 bits, the first to fourth AC power control signals C11 to C22 to generate an AC power in a duty ratio unit of 5%, a duty ratio unit of 3%, or a duty ratio unit of 2%, which is not limited thereto.

FIGS. 14A, 14B, 15A, 15B, 16A and 16B are views illustrating the magnitude of a fundamental wave of a signal outputted as a result of simulating an output waveform when changing a duty ratio of a full bridge of a power converter and the magnitude of a harmonic that is multiple components of a fundamental wave.

A simulation is performed using a Fourier analysis of an output signal, basically.

An exponential Fourier series may be expressed as $$f(t) = \sum_{n=-\infty}^{\infty} C_n e^{jn\omega_o t}$$

and a harmonic component may be searched through the magnitude of complex coefficient Gn.

Further, a total harmonics distortion THD is used in order to compare degrees of harmonic components depending on duty ratios.

The total harmonics distortion THD is defined as a ratio of an RMS of a harmonic component and an RMS of a fundamental wave, which indicates degrees of harmonic occurrence.

In the embodiment, the total harmonics distortion THD is defined as a maximum harmonics distortion that is a ratio of an RMS of a maximum magnitude harmonic component having the maximum magnitude of harmonic components and an RMS of a fundamental wave. That is, the maximum harmonic distortion is defined as a ratio of an RMS of a maximum magnitude harmonic component contrasted with an RMS of a fundamental wave.

A distribution and magnitude of a harmonic component according to a duty ratio will be described with reference to the drawing.

A simulation result is produced by changing a duty ratio to 50%, 40% and 30% based on an amplitude of an output waveform 1V and a cycle, 143 Hz.

Figure 14A:
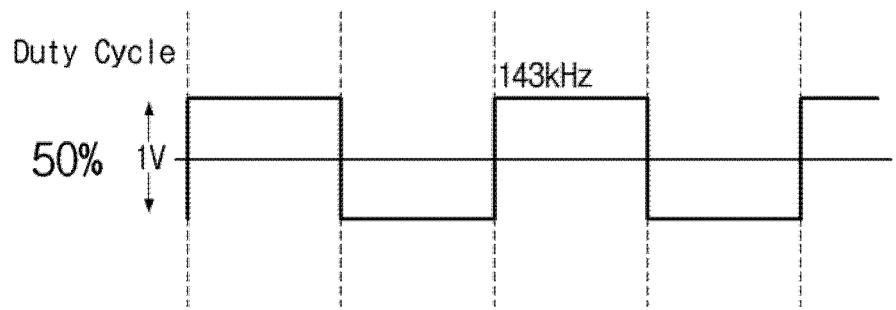
FIGS. 14A, 14B, 15A, 15B, 16A and 16B are views illustrating the magnitude of a fundamental wave of a signal outputted as a result of simulating an output waveform when changing a duty ratio of a full bridge of a power converter and the magnitude of a harmonic that is multiple components of a fundamental wave.
Figure 14B:
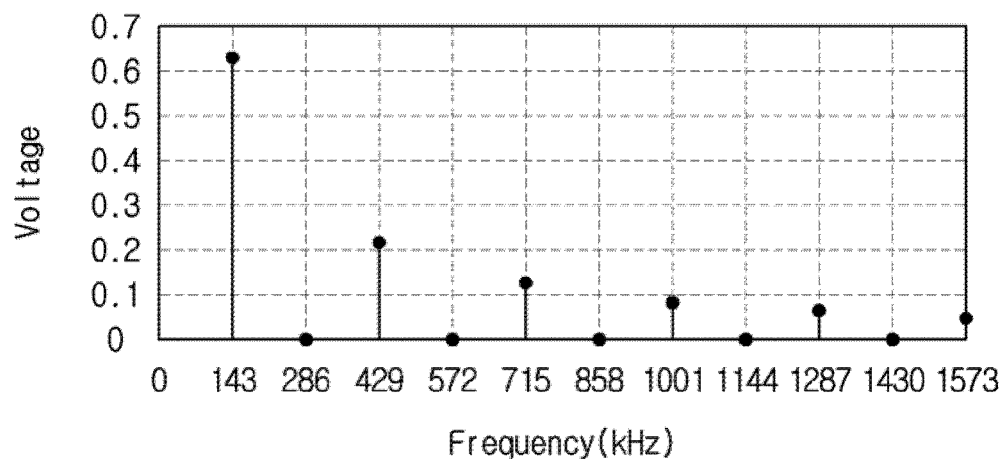

In FIGS. 14A and 14B, when a duty ratio is 50%, a fundamental wave has a magnitude between 0.6V and 0.7V, and even number harmonics appear but odd number harmonics do not appear.

When a duty ratio is 50%, an approximate value of the maximum harmonics distortion is 0.22/0.65=24%.

Figure 15A:
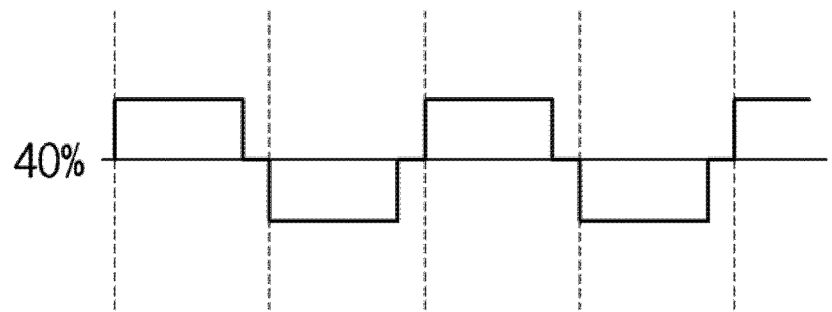
Figure 15B:
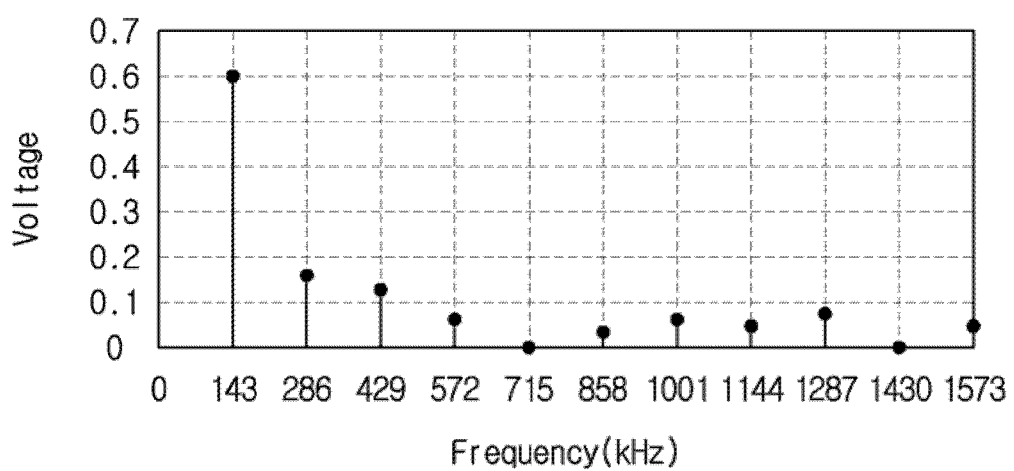

In FIGS. 15A and 15B, when a duty ratio is 40%, it is noted that a fundamental wave has a value of about 0.6V, and even number and even number harmonics appear and the magnitude of a first harmonic component which is twice of a fundamental frequency among harmonic components is between 0.1V and 0.2V. As such, when a duty ratio is reduced from 50% to 40%, a maximum harmonics distortion becomes 0.15/0.6=25%, so that it may be confirmed that while even number and odd number harmonic components appear, the maximum harmonics distortion is improved.

Figure 16A:
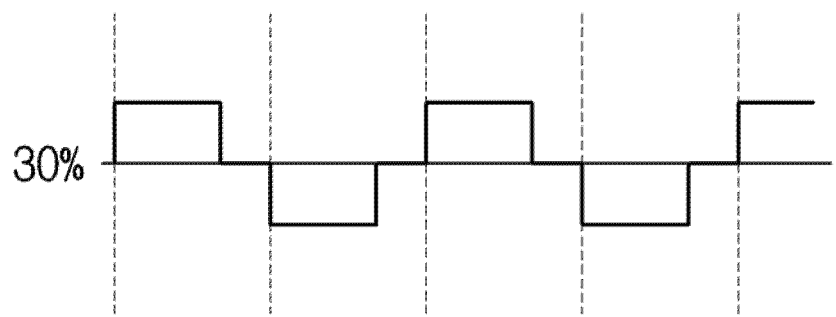
Figure 16B:
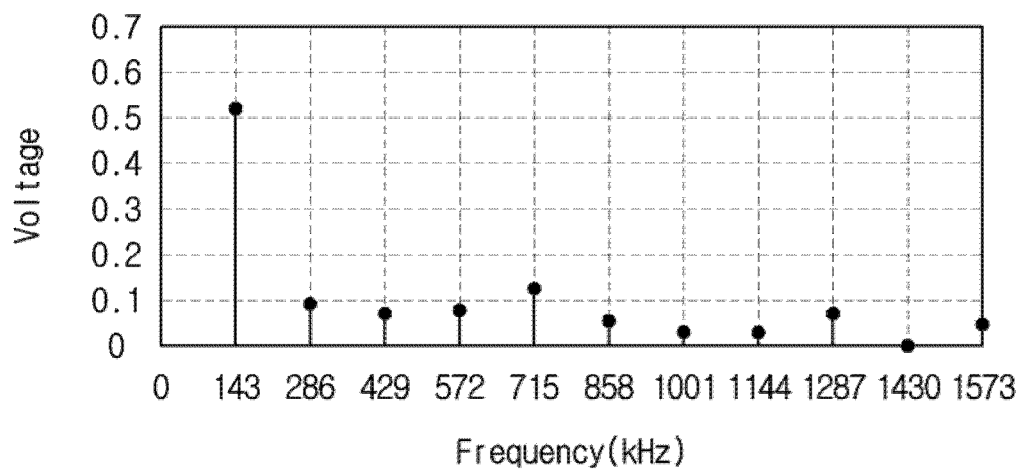

FIGS. 16A and 16B illustrate a case that a duty ratio is 30%. Here, a fundamental wave has a magnitude between 0.5V and 0.6V, the magnitude of a harmonic component that is five times of a fundamental frequency among harmonic components is between 0.1V and 0.2V. So, when calculating the maximum harmonic distortion with approximate values, it is 1.25/5.1=24%, so that it is noted that the maximum harmonics distortion is reduced.

Figure 17:
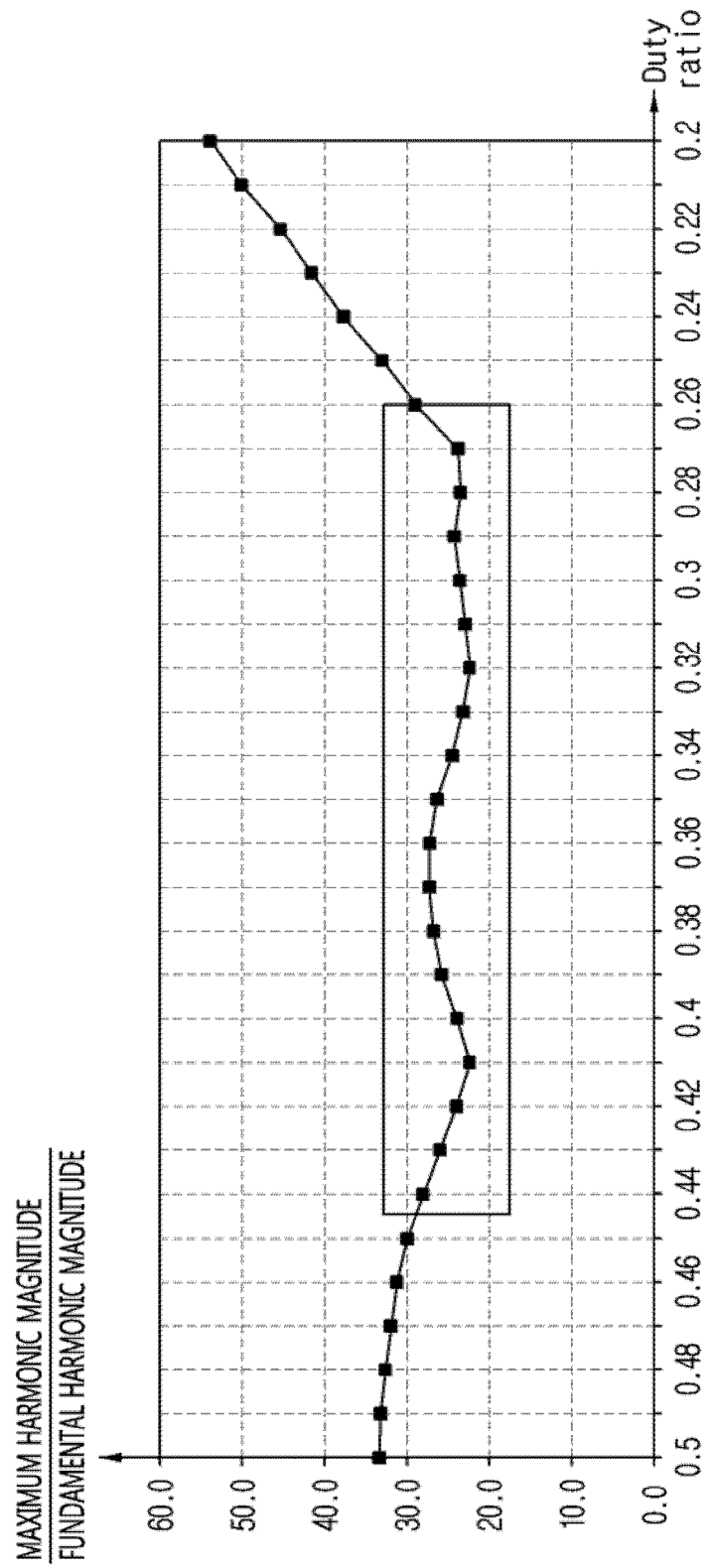
FIG. 17 is a view illustrating a simulation result of the maximum harmonic distortion ratio when changing a duty ratio.

FIG. 17 is a view illustrating a simulation result of the maximum harmonic distortion ratio when changing a duty ratio.

It is confirmed that the maximum harmonic distortion has a relatively small value in a duty ration interval of 0.26 to 0.44 (26% to 44%). That is, the duty ratio interval is an interval where less harmonic components are distributed.

Further, the maximum harmonic distortion is smallest when a duty ratio is 0.41 (41%) and 0.32 (32%), and the value of the maximum harmonic distortion becomes 23.6%.

As such, when using a full bridge inverter as the power converter 130 and regulating a duty ratio, it may be possible to control an output waveform to be approximated to a sign wave.

As described above, while a perfect sine wave does not include harmonic components, a sine wave having a distorted waveform due to a non-linear characteristic of a load includes harmonic components. Accordingly, when controlling an output voltage Vo to be approximated to a sine wave, the harmonic components may be reduced and an electromagnetic compatibility EMC may be maximized.

While the above-described simulation reviews an EMC characteristic using a ratio of the magnitude of a fundamental wave and the magnitude of the maximum harmonic component, which is not limited thereto. Rather, the EMC characteristic may be considered using a ratio of the magnitude of a fundamental wave and the magnitude of total harmonic components.

Here, it is desirable to control the power converter using a duty ratio with which the total harmonic distortion calculated with a ratio of the magnitude of a fundamental wave and the magnitude of total harmonic components.

<Method for Driving a Wireless Power Transfer System According to an Embodiment of the Present Disclosure>

Figure 18:
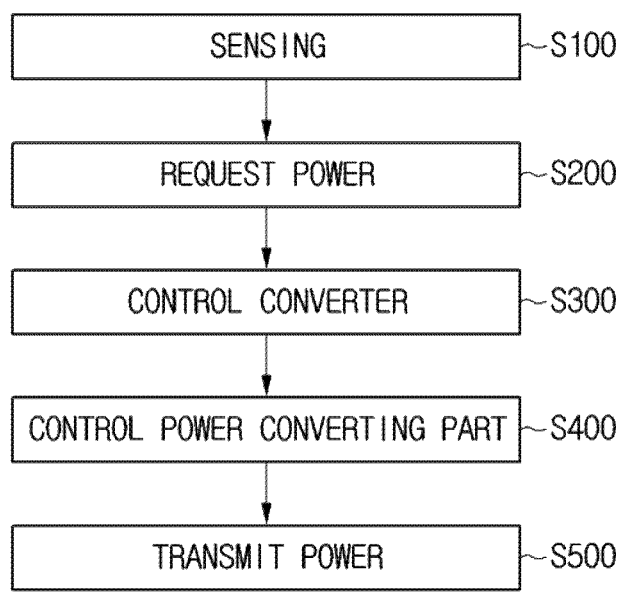
FIG. 18 is a signal flow chart illustrating operations of a wireless power transfer system according to an embodiment of the present disclosure.

FIG. 18 is a signal flow chart illustrating operations of a wireless power transfer system according to an embodiment of the present disclosure.

A first step is a sensing step (S100).

In case that the receiving part 200 approaches a charging region of the transmitting part 100, a wireless power transfer may start when the transmitting part 100 senses the receiving part 200 or in reverse the receiving part 200 senses the transmitting part 100.

The sensing step (S100) may be configured of sub-steps, a selection step to sense the receiving part 200, a ping step to receive a packet, and an identification and configuration step to receive a unique ID, an extension ID, and information on control parameters.

A second step is a power requesting step (S200).

In case that the receiving part 200 requests the transmitting part 100 to transmit power, for example, the receiving part 200 may request the transmitting part 100 to transmit a certain amount of power depending on status of the receiving part 200, that is, battery charging status of the receiving part 200, temperature status of the receiving part 200 and battery, the amount and degree of battery power consumption and battery charging speed.

A third step is a step to control the control part 140 and the converter 120 (S300).

The power transmission amount may be changed depending on status of the receiving part 200, and accordingly the control part 140 of the transmitting part 100 may control the converter 120 to regulate level of the DC power.

A fourth step is a step to control the power conversion part 130 of the control part 140 (S400) and a step to transmit power (S500).

The converter 120 may control first to fourth switching elements S1, S2, S3 and S4 of a full bridge inverter inside the power conversion part 130 using a PWM control signal.

A turning on or off ratio of the first to fourth switching elements S1, S2, S3 and S4 may be changed according to a duty ratio, and a degree of the harmonic components included in the power conversion part 130 may be changed according to a duty ratio. Accordingly, the control part may analyze the magnitude of the DC voltage transferred to the power conversion part 130 from the converter 120 and a frequency component of the output signal outputted from the power conversion part 130 to control a duty ratio of the PWM control signal.

As such, the control part 140 may determine a duty ratio to have a predetermined value among 26% to 44%, for example and provide the power conversion part 130 with a PWM control signal having the predetermined value as well. Also, the control part 140 may be fed back with signals outputted from the power conversion part 130, analyze harmonic components of the output signal to provide the power conversion part 130 with PWM control signal having a duty ratio in which a ratio of the magnitude of a fundamental wave and the magnitude of a maximum harmonic is a minimum, so that the control part 140 may enable the transmitting part 100 to provide the power requested by the receiving part 200.

When analyzing the harmonic components of the output signal fed back from the power conversion part 130 and analyzing, the output signal of the power conversion part 130 may be fed back and analyzed each predetermined period. Therefore, a real time control may be performed to determine a distortion degree of the power conversion part 130 depending on changes of the power transmission condition of the wireless power transfer system 10 or changes of system characteristic to output signals having optimized electromagnetic characteristic.

The transmitting part 100 of the wireless power transfer system 10 according to the embodiment of the present disclosure uses a full bridge inverter as the power converter 130.

The full bridge inverter has an effect to approximate the output signal to a sine wave so that the harmonic components are minimized, as well as an effect to increase the maximum power provided to the transmitting antenna system 102 compared with an half bridge inverter in the art.

Further, the control part 140 may regulate a duty ratio of the DC voltage level outputted from the converter 120 and first to fourth AC power control signals C11, C12, C21 and C22 that are PWM control signals provided to the power conversion part 130 to reduce harmonic components of the output signals outputted from the power conversion part 130. Also, the control part 140 may be fed back with the amount of power requested in the receiving part 200 and distortion status of the output signal of the power conversion part 130 depending on current status of the transmitting part and receiving part 100 and 200 to regulate a duty ratio of the first to fourth power control signals C11, C12, C21 and C22, thereby improving electromagnetic wave characteristics.

The method according to the above-described embodiment may be manufactured with a computer executable program and stored in a computer readable recording medium. Examples of the computer-readable recording medium include a ROM, RAM, CD-ROM, magnetic tape, floppy disk, optical data storage device and so on. Also, it may be implemented in the form of a carrier wave (e.g., transmission over Internet).

The computer-readable recording medium may be distributed in the computer system connected through a computer communication network, and may be stored and executed as codes readable in a distributed manner. Furthermore, functional program, code and code segments, used to implement the present disclosure can be derived by a skilled computer programmer from the description of the disclosure contained herein.

The receiving part 200 according to the embodiment may be mounted on a mobile terminal such as a mobile phone, a smart phone, a laptop computer, a digital broadcasting terminal, a personal digital assistance PDA, a portable multimedia player PMP, a navigation, and so on.

However, it is well known by those skilled in the art that the configuration of the embodiment may also be applicable to stationary terminals such as digital TV, desktop computer and the like, except the case applicable to mobile terminal only.

In the embodiment, the power transmission scheme by electromagnetic induction may mean a relatively low Q value and a tight coupling, and the power transmission scheme by resonance may mean a relatively high Q value and a loose coupling.

Although the present disclosure were described with reference to preferred embodiments, these are just examples and do not limit the present disclosure. The present disclosure may be changed and modified in various ways, without departing from the ideas and technical regions described in claims, by those skilled in the art. Accordingly, technical scope of the present disclosure is not restricted to the detailed description but should be defined by claims only.

INDUSTRIAL APPLICATION

The wireless power transfer device may be used in the field of wireless charging system.

The invention claimed is:

1. A transmitter for generating a wireless power transmitted to a receiver, the transmitter comprising:
    a control part for generating first to fourth AC power control signals; and
    a power conversion part for generating an AC power including a positive polarity output voltage and a negative polarity output voltage in response to the first to fourth AC power control signals, wherein the power conversion part includes:
    a first switching element connected between a first node and a second node and controlled in response to the first AC power control signal;
    a second switching element connected between the second node and a ground and controlled in response to the second AC power control signal;
    a third switching element connected between the first node and a third node and controlled in response to the third AC power control signal; and
    a fourth switching element connected between the third node and the ground and controlled in response to the fourth AC power control signal,
    wherein when the first and fourth switching elements are turned on in response to the first and fourth AC power control signals, the positive polarity output voltage is generated, and when the second and third switching elements are turned on in response to the second and third AC power control signals, the negative polarity output voltage is generated,
    wherein a duty ratio of the positive polarity output voltage is determined by a falling time of the fourth AC power control signal, and
    wherein a duty ratio of the negative polarity output voltage is determined by a falling time of the third AC power control signal.

2. The transmitter of claim 1, wherein the duty ratio is regulated depending on a power receiving status of the receiver.

3. The transmitter of claim 2, wherein the falling time of the fourth AC power control signal is ahead of a falling time of the first AC power control signal.

4. The transmitter of claim 2, wherein the falling time of the third AC power control signal is ahead of a falling time of the second AC power control signal.

5. The transmitter of claim 1, wherein the maximum AC power is generated when the duty ratio is 50%, and
    wherein the magnitude of the AC power is reduced when the duty ratio is decreased.

6. The transmitter of claim 1, wherein the power conversion part includes first to fourth switching elements,
    wherein the second and third switching elements are turned off in a time interval when the first and fourth switching elements are turned on, and
    wherein the first and fourth switching elements are turned off in a time interval when the second and third switching elements are turned on.

7. The transmitter of claim 1, wherein the control part defines a first blank interval where high level intervals of the first and second AC power control signals do not exist between a falling time of the first AC power control signal and a rising time of the second AC power control signal or between a rising time of the first AC power control signal and a falling time of the second AC power control signal.

8. The transmitter of claim 1, wherein the control part defines a second blank interval where high level intervals of the third and fourth AC power control signals do not exist between a falling time of the third AC power control signal and a rising time of the fourth AC power control signal or between a rising time of the third AC power control signal and a falling time of the fourth AC power control signal.

* * * * *

(12) INTER PARTES REVIEW CERTIFICATE (3341st)

United States Patent
Bae

(10) Number: US 10,193,392 K1
(45) Certificate Issued: Dec. 1, 2023

(54) WIRELESS POWER TRANSFER DEVICE AND WIRELESS POWER TRANSFER SYSTEM

(71) Applicant: Su Ho Bae

(72) Inventor: Su Ho Bae

(73) Assignee: SCRAMOGE TECHNOLOGY LIMITED

Trial Number:
IPR2022-00529 filed Feb. 2, 2022

Inter Partes Review Certificate for:
Patent No.: 10,193,392
Issued: Jan. 29, 2019
Appl. No.: 15/110,665
Filed: Jul. 8, 2016

The results of IPR2022-00529 are reflected in this inter partes review certificate under 35 U.S.C. 318(b).

INTER PARTES REVIEW CERTIFICATE
U.S. Patent 10,193,392 K1
Trial No. IPR2022-00529
Certificate Issued Dec. 1, 2023

AS A RESULT OF THE INTER PARTES REVIEW PROCEEDING, IT HAS BEEN DETERMINED THAT:

Claims 1-8 are cancelled.

\* \* \* \* \*